(12) United States Patent
Neatherway

(10) Patent No.: US 10,853,063 B2
(45) Date of Patent: Dec. 1, 2020

(54) COMMIT HISTORY LINEARIZATION

(71) Applicant: Microsoft Technology Licensing, LLC, Redmond, WA (US)

(72) Inventor: Robin Neatherway, Oxford (GB)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/663,002

(22) Filed: Oct. 24, 2019

(65) Prior Publication Data
US 2020/0150956 A1    May 14, 2020

Related U.S. Application Data

(63) Continuation of application No. 15/857,229, filed on Dec. 28, 2017, now Pat. No. 10,467,004.

(51) Int. Cl.
*G06F 8/77*    (2018.01)
*G06F 8/71*    (2018.01)

(52) U.S. Cl.
CPC . *G06F 8/77* (2013.01); *G06F 8/71* (2013.01)

(58) Field of Classification Search
USPC ......................................................... 717/101
See application file for complete search history.

(56) References Cited

U.S. PATENT DOCUMENTS

| | | | |
|---|---|---|---|
| 9,639,352 B1* | 5/2017 | van Schaik | G06F 8/77 |
| 10,467,004 B2* | 11/2019 | Neatherway | G06F 8/71 |
| 2014/0297592 A1* | 10/2014 | Ohtake | G06F 16/219 |
| | | | 707/638 |
| 2017/0269909 A1* | 9/2017 | Smith | G06F 8/34 |

* cited by examiner

*Primary Examiner* — John Q Chavis
(74) *Attorney, Agent, or Firm* — Workman Nydegger

(57) ABSTRACT

Methods, systems, and apparatus, including computer programs encoded on computer storage media, for linearizing the commit history of a code base. One of the methods includes receiving a request to attribute source code contributions to a particular snapshot in a project having a revision graph with multiple branches. Source code contributions occurring in each non-merge commit on a single path through the revision graph are attributed to a responsible developer entity of the non-merge commit. Each merge commit is processed on the single path including identifying contributions introduced by the merge commit, identifying one or more respective responsible developer entities for the contributions occurring in the one or more feature branch snapshots from one or more feature branches, and attributing source code contributions occurring in the one or more feature branch snapshots from the one or more feature branches to the identified one or more respective responsible developer entities.

14 Claims, 9 Drawing Sheets

COMMIT HISTORY LINEARIZATION

CROSS-REFERENCE TO RELATED APPLICATION

This application is a continuation of, and claims priority to, U.S. application Ser. No. 15/857,229, filed Dec. 28, 2017, the contents of which are herein incorporated by reference.

BACKGROUND

This specification relates to static analysis of computer software source code. Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot includes the source code of files of the code base as files existed at a particular point in time.

Snapshots stored in a version control system can be represented as a directed, acyclic revision graph. Each node in the revision graph represents a commit of the source code. A commit represents a snapshot as well as other pertinent information about the snapshot such as the author of the snapshot, and the data about ancestor commits of the node in the revision graph. A directed edge from a first node to a second node in the revision graph indicates that a commit represented by the first node is a commit preceding a commit represented by the second node, and that no intervening commits exist in the version control system.

Static analysis can be performed on a code base, which may be referred to as a project. The project generally includes a collection of source code files organized in a particular way, e.g., arranged in a hierarchical directory structure, with each source code file in the project having a respective path.

Static analysis techniques include techniques for attributing changes to a code base to a particular source. The source can be a particular snapshot where the change occurred, or the source can be a particular developer entity that introduced the change, e.g., a developer or a team of developers. Common source code contributions that can be attributed by a static analysis system include lines-of-code metrics, e.g., lines of code added, lines of code deleted, net lines of code added, lines of code modified, or some combination of these. For example, churn is a lines-of-code metric that is a count of lines of code added, deleted, or modified. Source code contributions can also include violation metrics, which measure relative numbers of coding defects introduced or removed, e.g., the introduction of coding defects, the removal of coding defects, net introductions of coding defects, or some combination of these. A coding defect is a segment of source code that violates one or more coding standards. A data element that represents a coding defect may be referred to as a violation.

Branching is the process of making a copy of a snapshot of the code base that is developed independently. Thus, subsequent modifications on the new branch do not affect later commits on the previous branch. Merging is the process of incorporating two branches into a single branch. Branching and merging processes allow parallel development to occur along multiple versions of the code base. The developed features can then be merged back together at a later time. Developers working in parallel on different branches can create new features in the branches. Branches that are used to create such new features may thus be referred to as feature branches.

Attributing source code contributions and correctly interpreting the attributions is difficult for real-world code bases that have multiple branches. In particular, branching and merging can introduce situations in which some developers get credit or blame for work that was actually introduced by others.

In addition, not all branches in a code base have the same importance. For example, branches for abandoned software features have relatively little importance, while branches having final versions of commercially valuable software products have much greater importance.

SUMMARY

This specification describes how a static analysis system can attribute source code contributions to a code base from the perspective of a single path through the commit history of the code base. This allows the system to accurately attribute source code contributions made on multiple branches in a principled way. To do so, the system can attribute source code contributions made in snapshots on the single path using special handling for merge commits. Thus, attributing source code contributions made on multiple different branches but from the perspective of a single path may be referred to as linearizing the commit history or equivalently, linearizing the revision graph.

For clarity, the selected single path may be referred as a "master branch." The master branch can be any appropriate single path through the revision graph and need not have any special importance relative to other commits or other branches in the code base. Other paths that may or may not eventually merge with the master branch may be referred to as "feature branches."

The subject matter described in this specification can be implemented in particular embodiments so as to realize one or more of the following advantages. Linearizing the commit history of a revision graph having multiple branches effectively trims noise from the data without losing any attribution accuracy from the perspective of the master branch. The data generated by a static analysis system more reliable and more trustworthy. This allows a system to display any appropriate metric of the code base, e.g., alerts, number of tests, lines of code, in a one-dimensional fashion (as opposed to trying to visualize the points corresponding to a commit graph) without suffering from the jitter caused by switching between branches. Thus, linearizing the commit history also makes understanding the progress of a software project easier to understand. For example, by limiting the types of commits added to a lines-of-code graph, the system can create a graph with easier-to-understand trends.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A static analysis system can linearize a commit history of a code base by analyzing the code base according to a single path through the revision graph of the code base. The static analysis system can then compute accurate attributions for feature branches using backward transitive violation matching. In this way, the static analysis system can effectively trim noise out of the data without losing any attribution accuracy.

Figure 1A:
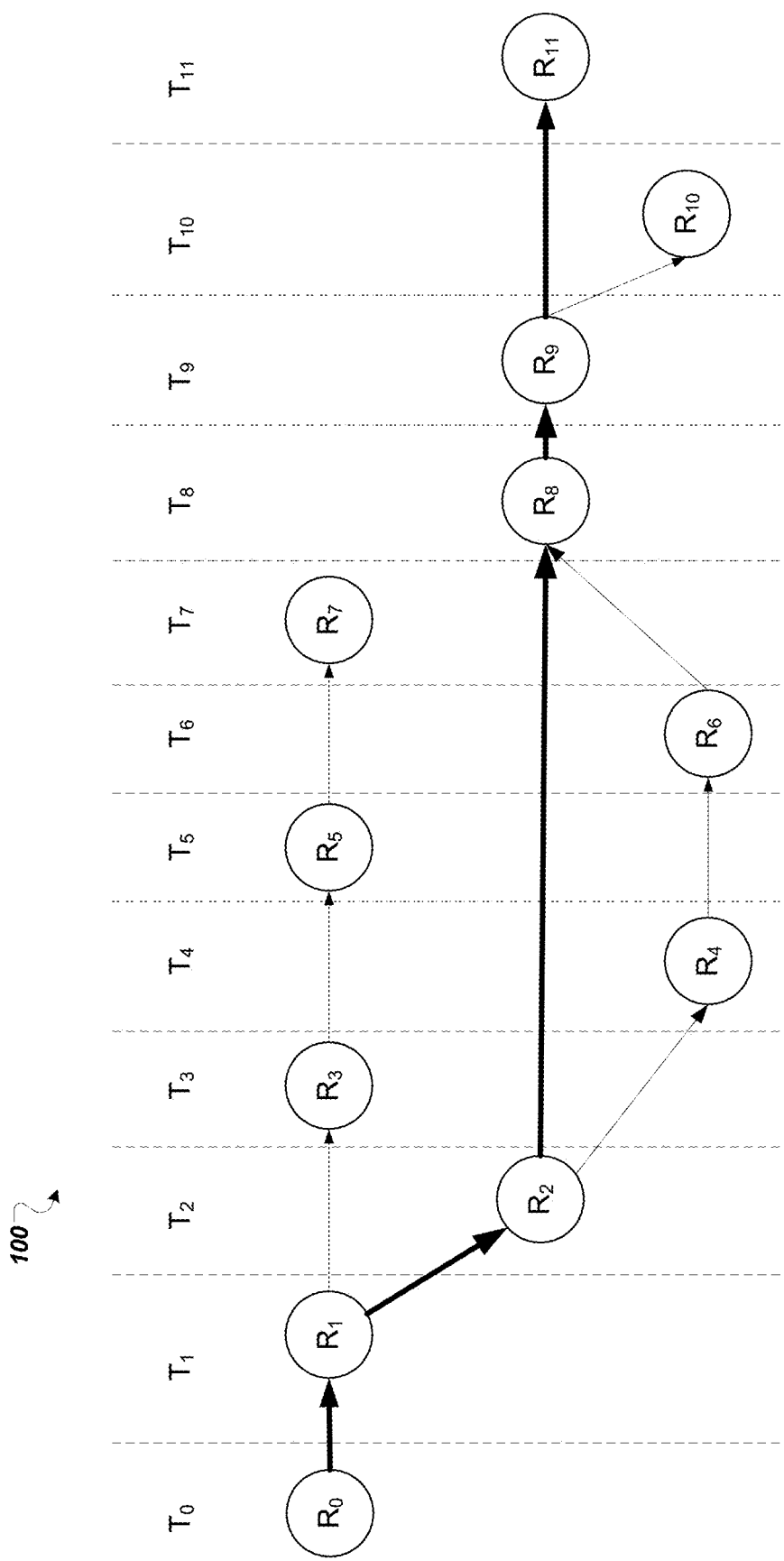
FIG. 1A illustrates a prior art example of generating net lines-of-code statistics for a revision graph having multiple branches.

FIG. 1A illustrates a revision graph 100 having multiple branches. The revision graph 100 includes snapshots $R_0$ through $R_{11}$, which were committed to a project at times $T_0$-$T_{11}$ respectively.

TABLE 1 includes an example of net lines of code contributed by developer entities responsible for each snapshot in the revision graph 100.

TABLE 1

| Snapshot | Commit Time | Responsible Developer Entity | Net Lines of Code Contributed by Responsible Developer Entity |
|---|---|---|---|
| $R_0$ | $T_0$ | $D_0$ | 20,000 |
| $R_1$ | $T_1$ | $D_1$ | 5,000 |
| $R_2$ | $T_2$ | $D_2$ | 15,000 |
| $R_3$ | $T_3$ | $D_3$ | 3,000 |
| $R_4$ | $T_4$ | $D_4$ | −2,000 |
| $R_5$ | $T_5$ | $D_2$ | 1,000 |
| $R_6$ | $T_6$ | $D_3$ | 500 |
| $R_7$ | $T_7$ | $D_1$ | 1500 |
| $R_8$ | $T_8$ | $D_0$ | 4000 |
| $R_9$ | $T_9$ | $D_0$ | 1000 |
| $R_{10}$ | $T_{10}$ | $D_3$ | 200 |
| $R_{11}$ | $T_{11}$ | $D_1$ | 2000 |

Without linearizing the commit history, analyzing and attributing source code contributions for snapshots in the revision graph 100 can generate misleading or unhelpful results in multiple ways. First, from the perspective of the latest version of the source code in $R_{11}$, some snapshots in the revision graph contribute nothing. For example, changes introduced in snapshots $R_3$, $R_5$, $R_7$, and $R_{10}$ never get incorporated into $R_{11}$. Therefore, for example, a developer who committed $R_{10}$ had no impact on $R_{11}$. And, if a goal of the analysis is to appropriately attribute contributions to source code in the latest version in $R_{11}$, the contributions in $R_{10}$ should be excluded. In other words, linearizing the commit history presents the developer $D_3$ from getting credit for 200 absolute lines of code that had no impact on $R_{11}$. And the same holds true for the other non-merged revisions $R_3$, $R_5$, and $R_7$.

In addition, because of the multiple feature branches, it is not exactly clear how the project is progressing as a whole when the snapshots are ordered by date. For example, from $R_0$ to $R_2$, 40,000 net lines of code are added to the project. And even though $R_3$ introduces an additional 3,000 lines of code, the project will appear to have lost code because $R_3$ and $R_2$ are on different branches.

Figure 1B:
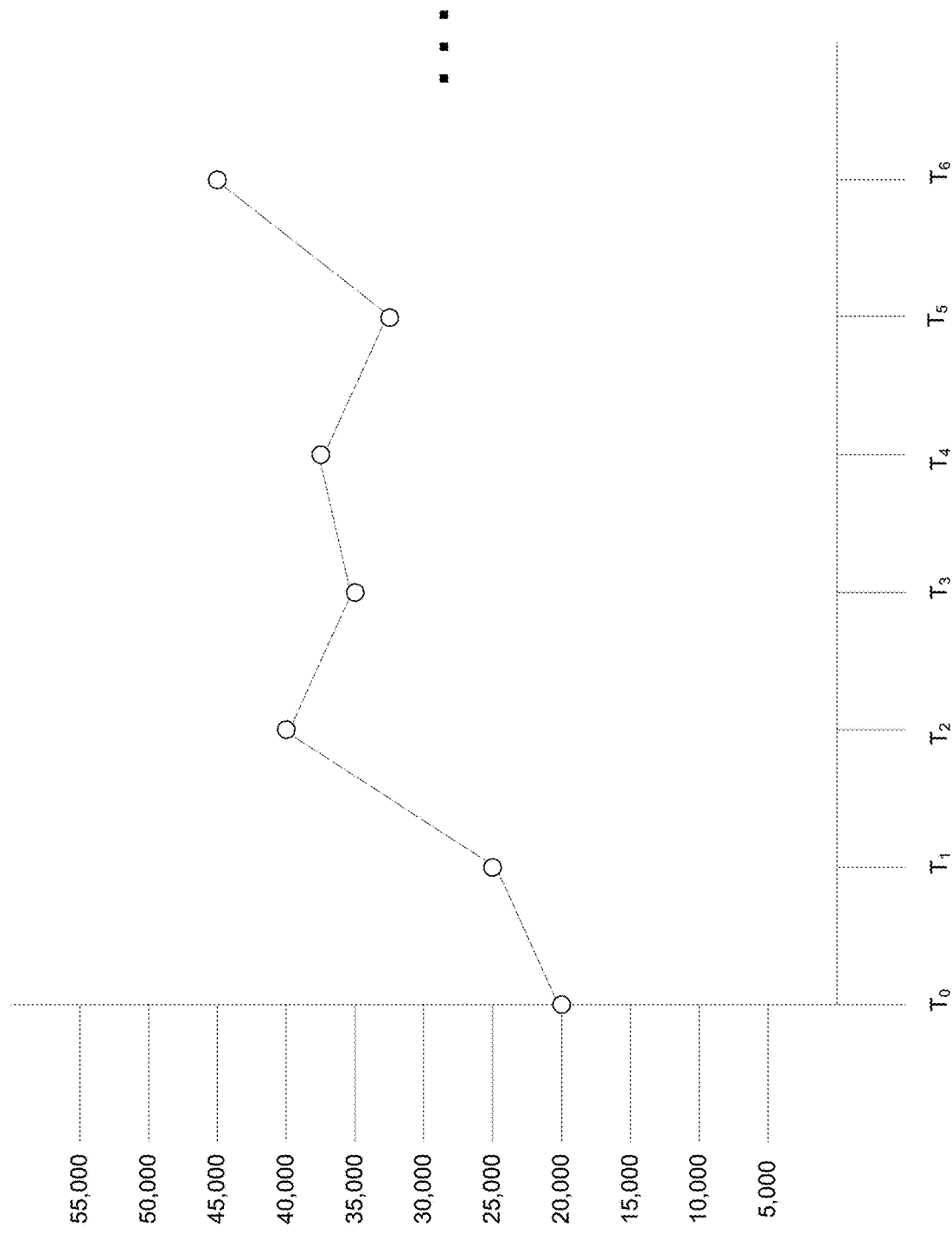
FIG. 1B illustrates a prior art net lines-of-code graph.

FIG. 1B graphically illustrates an absolute lines of code graph for a project without a linearized commit history. The absolute lines-of-code graph shows how the project progresses from $R_0$ through $R_6$, showing a dip in absolute lines of code in the project even though $R_3$ actually added 3,000 lines of code.

Figure 1C:
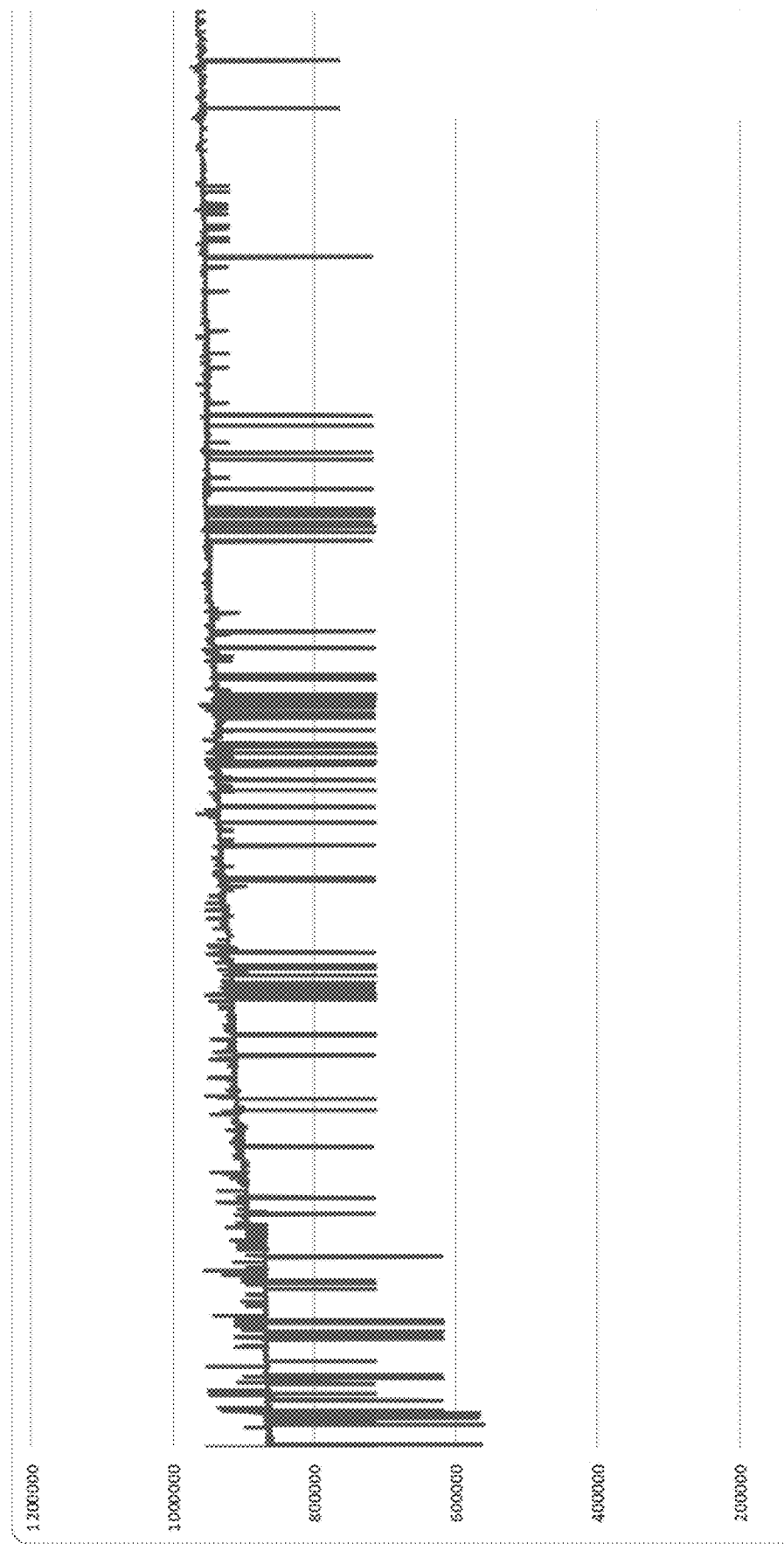
FIG. 1C illustrates a prior art net lines-of-code graph.

The situation becomes even more problematic for real-world code bases. FIG. 1C illustrates a net lines-of-code graph without linearizing the commit history for a real-world code base. This graph shows jumps and dips in the code when commits are performed in the code base, producing a spiky effect that can make it unclear how the project is progressing as a whole.

To address these problems, a system can linearize the commit history of the project by analyzing source code contributions from the perspective of a single path through the revision graph. To do so, the system designates a path through the snapshot as the master branch. The master branch may or may not be the master branch as designated by a version control system that maintains the revision graph. This is described in more detail below with reference to FIG. 4.

The master branch often represents the latest version of a software product or a version of a software product that was actually shipped or implemented, as opposed to a version of the project that is experimental or still in development. In this example, the snapshot Ru represents the latest version of the software project.

In this example, a path defining the master branch includes the latest version of the software project and extends through revisions $R_0$, $R_1$, $R_2$, $R_5$, $R_9$, and $R_{11}$. In FIG. 1A, the master branch is indicated by bold arrows between the revisions. The other branches in the revision graph 100 are therefore feature branches.

Note that some code in the feature branches does get incorporated into the latest version of the product in $R_{11}$. This occurs by operation of the merge commits at $R_8$ and $R_9$.

On the other hand, some code in the feature branches does not get incorporated into the latest version of the product in $R_{11}$. For example, $R_{10}$ includes code that was never incorporated into $R_{11}$. Therefore, the contributions in $R_{10}$ can be ignored when attributing contributions to the source code to the latest revision on the master branch in $R_{11}$.

Figure 2:
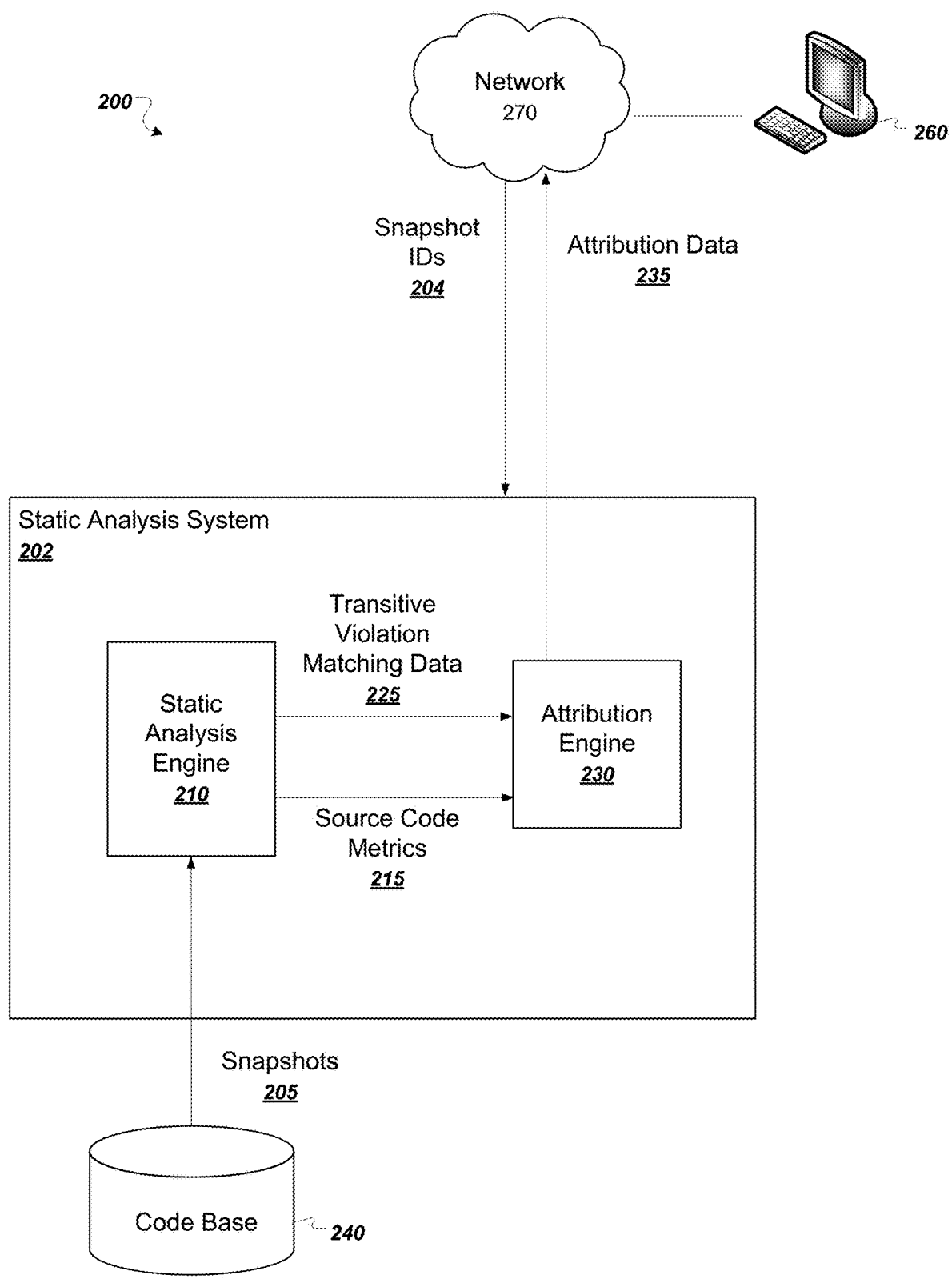
FIG. 2 illustrates an example system.

FIG. 2 illustrates an example system 200. The system 200 includes a user device 260 in communication with a static analysis system 202 over a network 270. The static analysis system 202 includes several functional components, including a static analysis engine 210 and an attribution engine 230. The components of the static analysis system 202 can be implemented as computer programs installed on one or more computers in one or more locations that are coupled to each other through a network. Alternatively, the static analysis system 202 can be installed in whole or in part on the user device 260.

A user of user device 260 can initiate static analysis of snapshots of the code base 240. The user device 250 can communicate with the static analysis system 202 over the network 270, which can be an appropriate data communications network, e.g., one that includes an intranet or the Internet. For example, a user of user device 260 can specify snapshot identifiers 204 of two or more snapshots or an entire code base for analysis.

The static analysis system can use the static analysis engine 210 to identify characteristic segments of source code in the snapshots 205 of the code base 240. The static analysis engine 210 can then compute appropriate source code metrics 215. For example, the source code metrics 215 can indicate a number of lines of code that have been added or deleted between adjacent snapshots in the revision graph of the code base 240. Other metrics include net lines of code introduced, violations introduced, violations removed, or net violation introductions, to name just a few examples. Techniques for identifying violations that have been introduced and removed between snapshots are described in more detail in commonly owned U.S. Pat. No. 9,262,157, entitled VIOLATION MATCHING AND ATTRIBUTION, filed on Apr. 24, 2015, and which is herein incorporated by reference.

The static analysis engine 210 can also compute transitive violation matching data 225, which represents one or more snapshots in which particular coding defects persisted in the code base. The transitive violation matching data can include, for a particular coding defect, the snapshot in which the coding defect first occurred and the snapshot in which the coding defect last occurred, if it has been removed. Techniques for computing transitive violation matching data are described in more detail in commonly owned U.S. Pat. No. 9,507,590 entitled TRANSITIVE VIOLATION MATCHING, filed on Dec. 9, 2016, and which is incorporated herein by reference.

The attribution engine 230 receives the source code metrics 215 and optionally the transitive violation matching data 225. The attribute engine 230 can then identify a single path defining a master branch in the code base 240 and attribute source code contributions along that single path using special handling for merge commits, which is described in more detail below.

At this point, the static analysis system 202 can provide the attribution data back to the user device 260, e.g., over the network 270. The attribution data can also include a graphical presentation that illustrations how the attributed source code metrics change over time from the perspective of the master branch. And such information computed from linearized commit histories tends to be more understandable than source code metrics computed from non-linearized commit histories. The presentation can contain information about lines of code, violations introduced, violations removed, and other code characteristics. The presentation can also provide information about who is responsible for the changes in the master version of the code at any particular point in time using transitively matched violations as described above or using commit history for characteristics such as lines of code or certain code functionality.

Figure 3A:
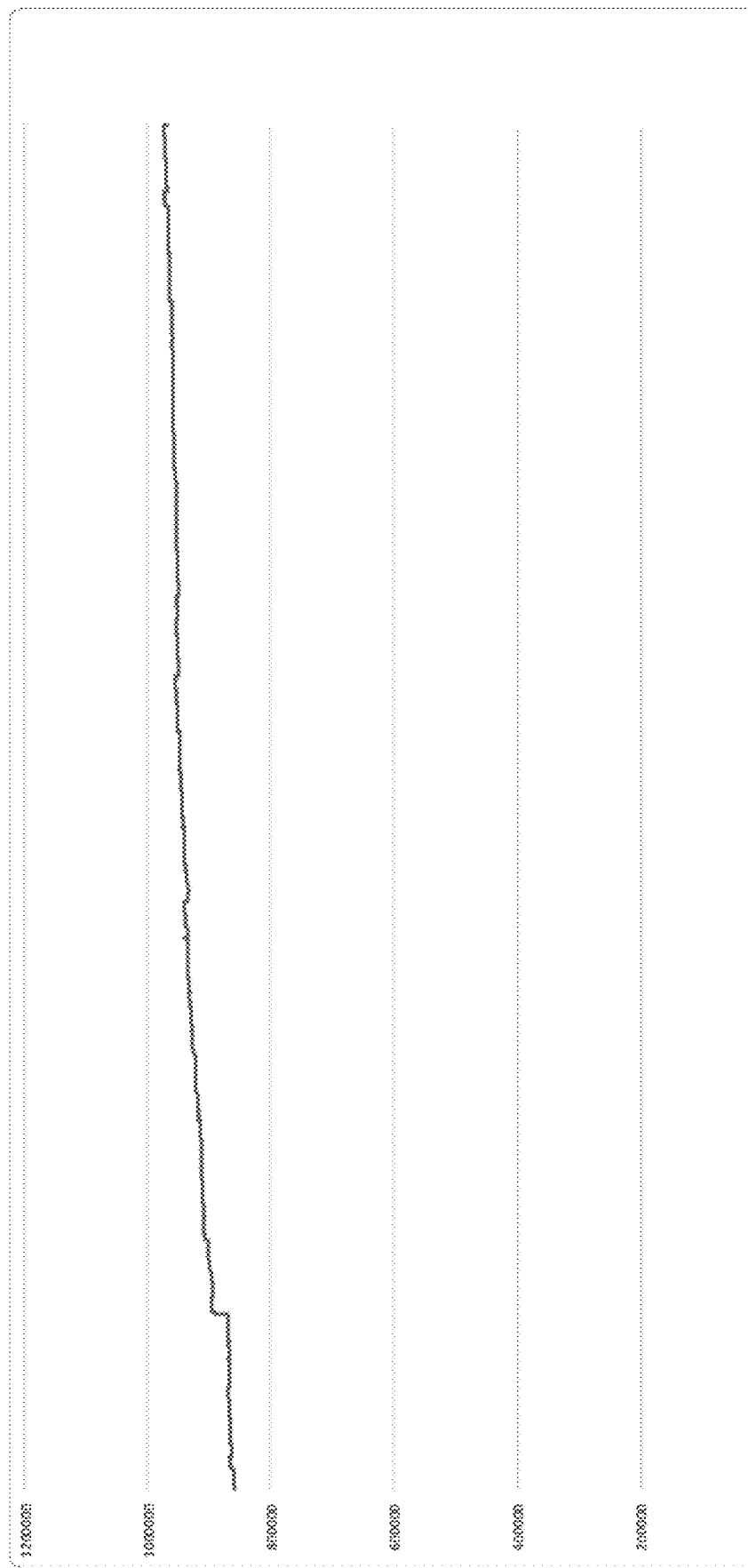
FIG. 3A illustrates an absolute lines of code graph from an example static analysis system.

FIG. 3A illustrates an example absolute lines of code graph. The graph in FIG. 3A has been computed from the same project as the graph in FIG. 1C. However, unlike the graph in FIG. 1C, the graph in FIG. 3A has been computed from a linearized commit history. Thus, the graph shows a fairly smooth upward trend in absolute lines of code without dramatic spikes or dips.

Figure 3B:
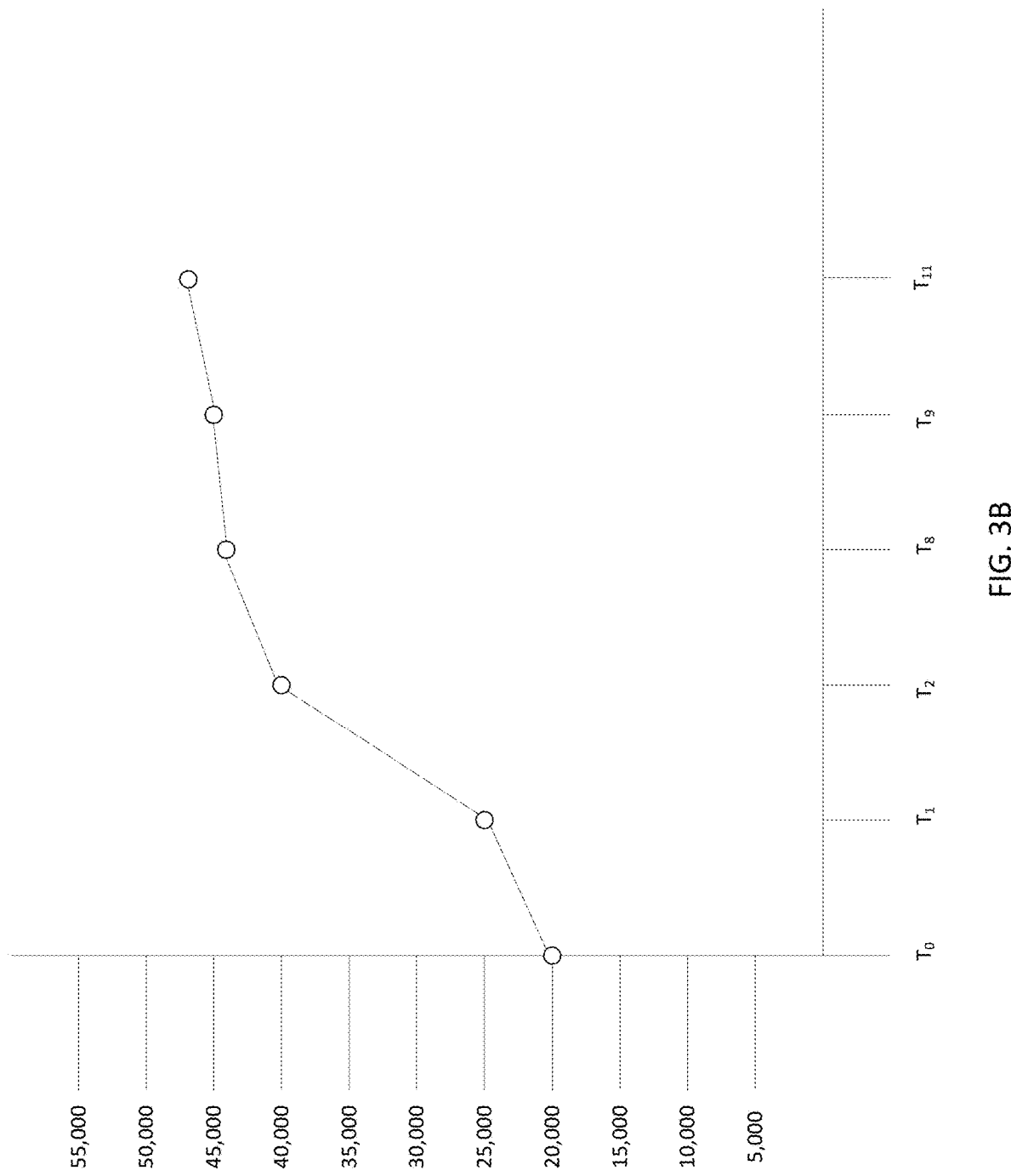
FIG. 3B illustrates an example absolute lines-of-code graph.

FIG. 3B illustrates an example absolute lines-of-code graph. The graph in FIG. 3B has been computed from the same revision graph as the graph in FIG. 1B. However, the graph in FIG. 3B has been computed from a linearized commit history. As a result, the graph is smoother and easier to understand. Recall from the graph in FIG. 1B that it was unclear how the project was progressing. In contrast, by computing the graph from a linearized commit history, it is very clear in FIG. 3B that code is being added to the project, possibly the result of new features being incorporated into the master branch.

Figure 4:
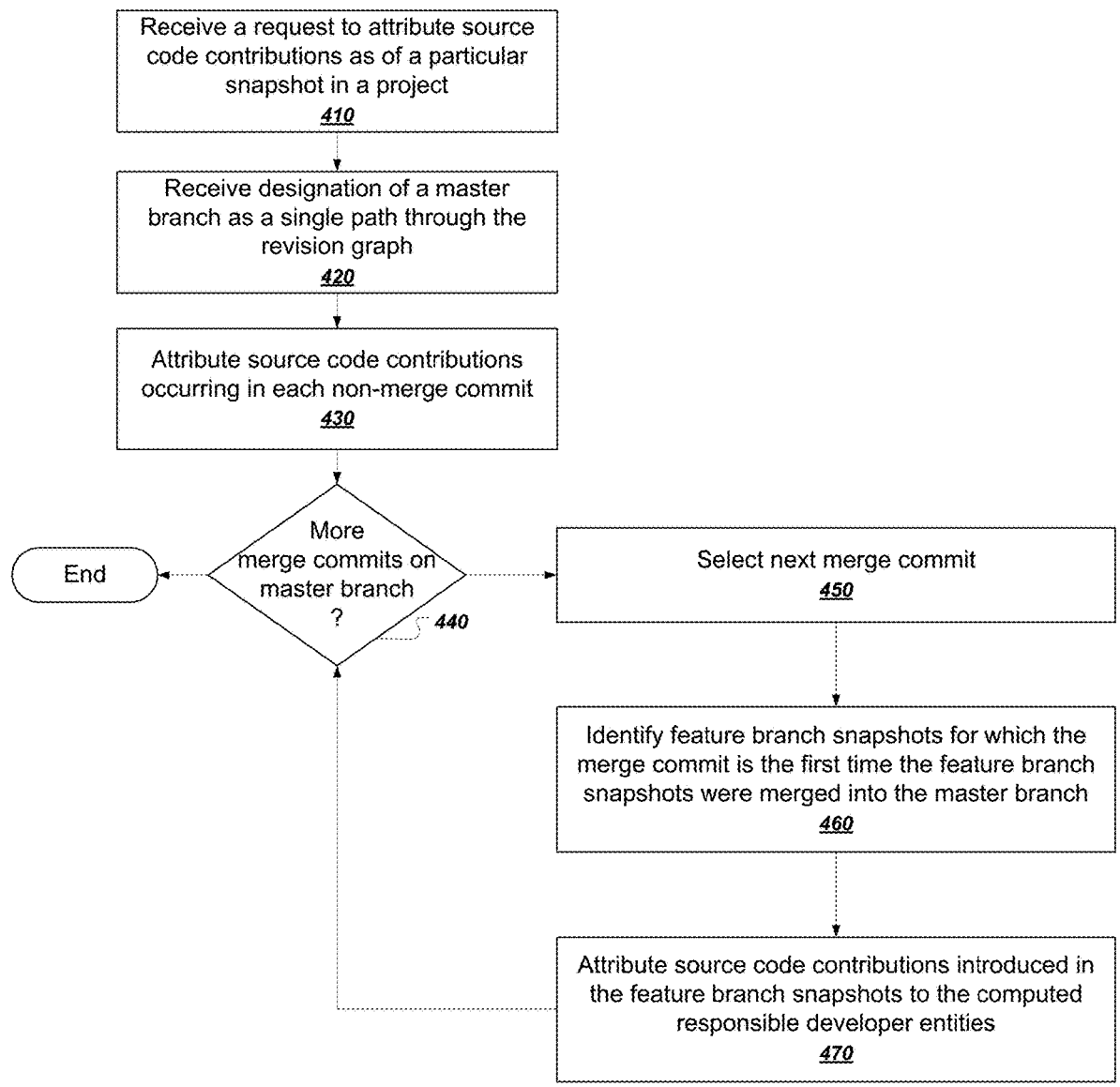
FIG. 4 is a flowchart of an example process for analyzing data in a code base from the perspective of a single path through the commit history of a code base.

FIG. 4 is a flowchart of an example process 400 for attributing source code contributions to a code base using a linearized commit history of the code base. For convenience the process 400 will be described as being performed by a system of one or more computers, located in one or more locations, and programmed appropriately in accordance with this specification. For example, a static analysis system, e.g., the static analysis system 200 of FIG. 2, appropriately programmed, can perform the process 400.

The system receives a request to attribute source code contributions as of particular snapshot in a project having a revision graph with multiple branches (410). The particular snapshot can be specified explicitly by user input. Alternatively, the particular snapshot can be specified implicitly as a latest revision of source code in the project or a latest shipped revision of source code in the project.

The system receives a designation of a single path through the revision graph (420). The single path will generally include the particular snapshot and a plurality of other snapshots that precede the particular snapshot in the revision graph. The path can also be specified explicitly by user input as a sequence of snapshot identifiers. Alternatively or in addition, the system can use a branch that is designated as a master branch by an underlying version control system.

In some code bases, the master branch is only partially designated or not designated at all. For example, in some code bases, a particular snapshot can be designated as the current state of the master branch, but the history of the master branch that resulted in the particular snapshot may not be designated at all. In these cases, the system can use certain heuristics to compute which branch should be considered the master branch. For example, typically the first-mentioned parent of a merge commit is on a branch that one or more other snapshots are merged into. Therefore, the system can discover the master branch by always following the first parent of any merge commit. Another approach is to poll the version control system as frequently as practical. On each poll operation the current head of the master branch will be obtained and the samples built up in this way will give a set of commits guaranteed to be part of the master branch. For any pair of commits in the sample set that do not have any merges between them, all commits between are also guaranteed to be on the master branch. Where merges are found between the commits, a path can be chosen arbitrarily, which means that the correct path will not always be used, although the benefits of linearization are still gained.

The system attributes source code contributions occurring in each non-merge commit on the single path to a responsible developer entity for the non-merge commit (430). A non-merge commit is a snapshot that does not merge changes from multiple ancestor snapshots. To attribute source code contributions, the system can compare adjacent snapshots along the single path. The system compares each snapshot of the particular branch to an ancestor snapshot to determine source code contributions that were made by the responsible developer entity when the snapshot was committed. For example, the system can compare a particular snapshot to its ancestor to determine net lines of code that were contributed by the responsible developer entity. Alternatively or in addition, the system can compare a particular snapshot to its ancestor to determine which violations were introduced or removed by the responsible developer entity, a process that typically requires violation matching between the snapshots.

The system then processes each merge commit on the single path. Thus, the system determines whether there are more merge commits on the master branch to be processed (440). A merge commit is a snapshot that merges changes from multiple ancestor snapshots. From the perspective of a linearized commit history, a merge commit therefore introduces changes from at least one master branch snapshot on the master branch and at least one feature branch snapshot on one or more feature branches.

If there are more merge commits to be processed, the system selects the next merge commit to be processed (branch to 450). The system can process the merge commits in any appropriate order that need not be time-based or at least partially in parallel.

The system identifies feature branch snapshots of one or more feature branches for which the merge commit is the first time the feature branch snapshots were merged into the master branch (460). The feature branch snapshots are snapshots that are not on the master branch and from which the merge commit is reachable according to the revision graph. In the basic situation with one feature branch, the feature branch snapshots include all snapshots on a feature branch that are merged back into the master branch.

More complicated revision graphs can introduce additional complexity. For example, multiple merge commits on the master branch can be reachable from the same feature branch snapshot. In that case, the system can use the earliest merge commit in the commit history because it represents the earliest time that the contributions from the feature branch snapshot appeared in the master branch.

The system attributes source code contributions to the feature branch snapshots to responsible developer entities (470).

For lines-of-code metrics, e.g., net lines of code, the system can determine a developer entity responsible for each feature branch snapshot. The system can then attribute to the responsible developer entity the appropriate lines-of-code metric for that snapshot. This typically involves computing new lines of code, deleted lines of code, modified lines of code, or some combination of these, relative to a previous snapshot.

For violation metrics, the system can attribute all violation status changes in all the feature branch snapshots or only violation status changes that actually occurred in the merge commit on the master branch. In other words, the system need not attribute violation introductions or removals for violations that never actually affected the master branch. In other words, the system can determine to only attribute violation introductions for violations that do not occur in the master branch before the merge commit but are introduced by the merge commit. Similarly, the system can determine to only attribute violation removals for violations that do occur in the master branch before the merge commit but are removed by the merge commit. This is because from the perspective of a master branch, a violation that is introduced and removed on a feature branch before the merge commit has no actual impact on the final snapshot of interest.

The system can attribute violation metrics by using transitive violation matching. Therefore, for each violation that did not occur on the master branch just before the merge commit but that is introduced by the merge commit, the system can use transitive violation matching to determine the feature branch snapshot in which the violation was first introduced. The system can then attribute a violation introduction to the developer entity responsible for the feature branch snapshot in which the violation was introduced.

For each violation that occurs on the master branch just before the merge commit but that is removed by the merge commit, the system can use transitive violation matching to determine the feature branch snapshot in which the violation was first removed. The system can then attribute a violation removal to the developer entity responsible for the feature branch snapshot in which the violation was removed.

In some version control systems, the merge commit itself can introduce changes that are not part of any ancestor snapshots. The system can attribute such contributions in the same way that it attributes contributions in non-merge commits, e.g., by attributing the contributions to the developer entity responsible for the merge commit.

When attributing the source code contributions, the system can also assign a time to the contributions. In some implementations, the system assigns a time for the merge commit to all contributions from the feature branches regardless of when the feature branch snapshots were committed. Thus, a responsible developer entity can get credit for making a change at a time much later than the time that the changes were actually committed by the developer entity. From the example of FIG. 1A, the developer entity responsible for committing snapshot $R_6$ at time $T_6$ may not get credit for such contributions until they are merged at time $T_8$.

The system then determines whether there are more merge commits to be processed (440). If so, the system selects a next merge commit (branch to 450). Otherwise, the process ends (branch to end).

Figure 5:
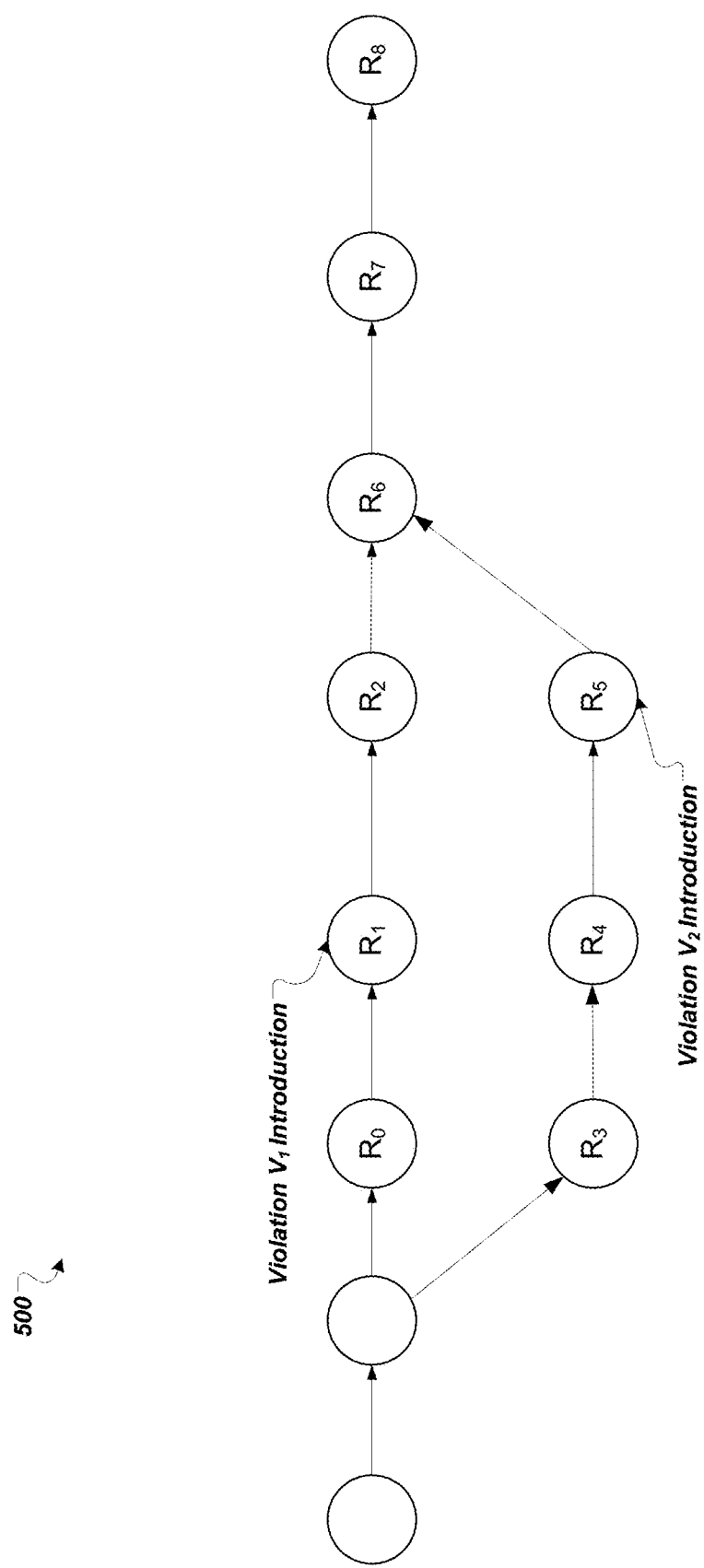
FIG. 5 illustrates an example graph of snapshots in a code base across a merge commit.

FIG. 5 illustrates an example graph 500 of snapshots in a code base across a merge commit. FIG. 5 illustrates how a system can attribute violations introduced on the master branch differently from violations introduced in feature branches. In this example, the system defines a master branch to include snapshots $R_0$, $R_1$, $R_2$ $R_6$, $R_7$, and $R_8$, whereas the system defines a feature branch to include snapshots $R_3$, $R_4$, and $R_5$. As illustrated, the feature branch is merged into the master branch at snapshot $R_6$.

A violation, $V_1$, is introduced in the master branch at master branch snapshot $R_1$. The violation is not removed, and the violation therefore also exists in master branch snapshot $R_2$.

Another violation, $V_2$, is introduced in the feature branch at snapshot $R_5$. When the merge commit occurs at snapshot $R_6$, the violation $V_2$ is merged into the master branch.

Because the violation $V_1$ is introduced in a master branch snapshot, the system can attribute the introduction of $V_1$ normally, e.g., to a developer entity responsible for the snapshot $R_1$.

From the perspective of the master branch, the violation $V_2$ is introduced in the merge commit at $R_6$. The system can determine this because the violation $V_2$ will match a violation in the feature branch snapshot $R_5$ but will not match a violation in the master branch snapshot $R_2$. However, the system does not necessarily attribute the violation $V_2$ to the developer entity responsible for committing the merge commit $R_6$. Rather, the system can use transitive violation matching to identify a developer entity that introduced $V_2$ on the feature branch, namely, the developer entity responsible for $R_5$. The system can then attribute the violation $V_2$ to the developer entity responsible for $R_5$ but consider the violation to have been introduced at the time $R_6$ was committed rather than at the time $R_5$ was committed.

Figure 6:
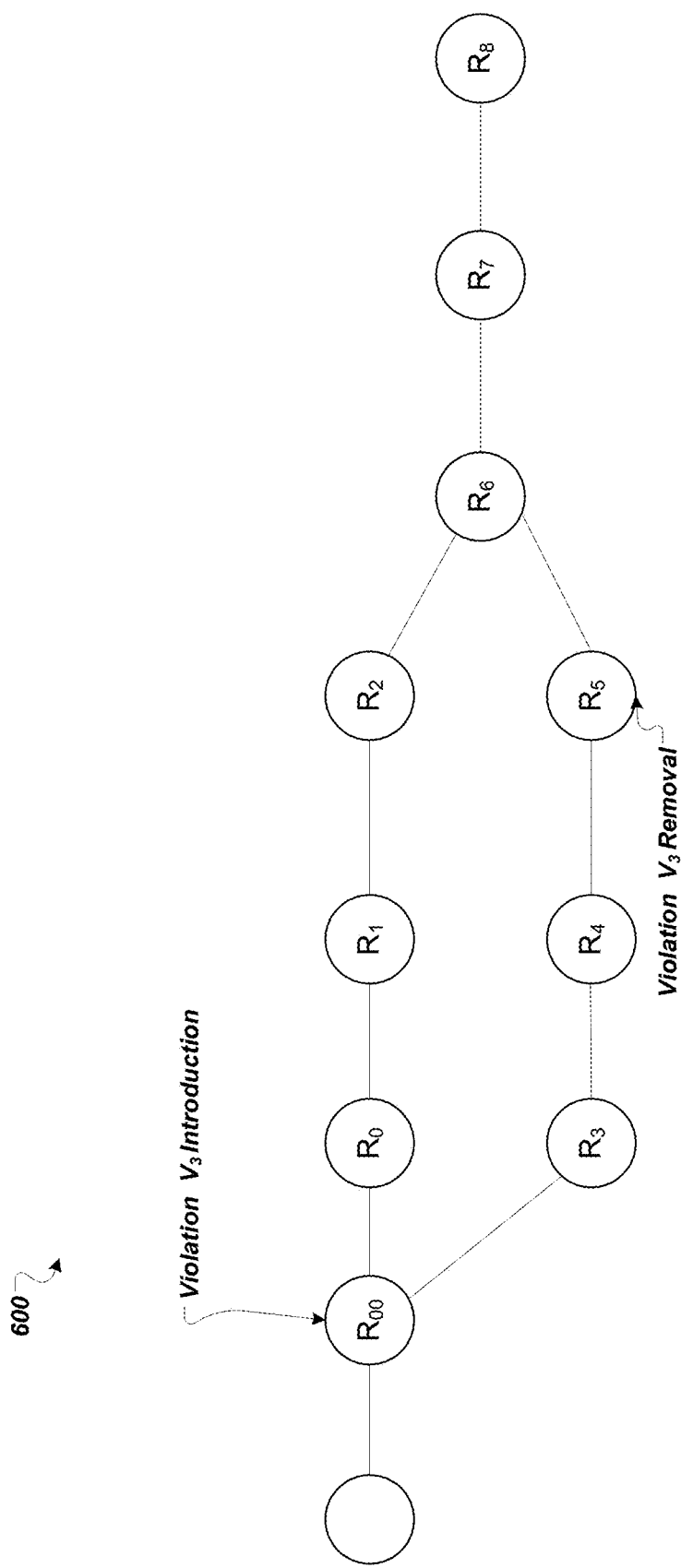
FIG. 6 illustrates an example graph of snapshots in a code base across a merge commit.

FIG. 6 illustrates an example graph of snapshots in a code base that includes a merge commit. As described above, the system defines a master branch of the code base to include snapshots R00, $R_0$, $R_1$, $R_2$ $R_6$, $R_7$, and $R_5$, whereas the system defines a feature branch to include snapshots $R_3$, $R_4$, and $R_5$. As illustrated, the feature branch is merged into the master branch at snapshot $R_6$. A violation, $V_3$, is introduced into the master branch at master branch snapshot $R_{00}$ prior to the creation of the feature branch. The violation $V_3$ is subsequently removed from the feature branch at snapshot $R_5$. However, the violation $V_3$ is not removed from the master branch prior to the merge commit in the snapshot $R_6$. When the merge commit occurs at snapshot $R_6$, the static analysis system compares the merge commit at snapshot $R_6$ with the previous snapshot of the master branch at $R_2$ to determine status changes of violations. By performing this comparison, the static analysis system can determine that the violation $V_3$ existed in $R_2$ but not in $R_6$.

From the perspective of the master branch, the violation $V_3$ is removed in the merge commit at $R_6$. But attributing the removal to the developer entity responsible for $R_6$ unfairly gives that developer entity credit for a violation removal that was actually performed by someone else, assuming that different developer entities committed $R_5$ and $R_6$.

To determine where the violation was actually been removed, the system can compute transitive violation matches for the violation $V_3$. For $V_3$, the transitively matched violations are violations $V_{R00}$, $V_{R0}$, $V_{R1}$, $V_{R2}$, and $V_{R6}$ in master branch snapshots $R_{00}$, $R_0$, $R_1$, $R_2$, and $R_6$ respectively; and $V_{R3}$ and $V_{R4}$ in feature branch snapshots $R_3$ and $R_4$ respectively. The static analysis system determines that $V_3$ existed and has subsequently been removed from the feature branch in $R_5$. Therefore, the system can instead attribute the violation removal to the developer entity responsible for $R_5$, who is the developer entity that actually removed the violation.

Once the merge commit has been performed, the static analysis system can provide a user device with a graph that shows the attributes of the snapshots to the master branch of the code at any particular point in time. This graph can contain information about lines of code, violations introduced, violations removed, lines of comments, number of tests, number of dependencies on external libraries, and lines of duplicate code, as well as any other appropriate code characteristics.

The graph can also provide information about who is responsible for the changes in the master version of the code at any particular point in time using transitively matched violations as described above or using commit history for characteristics such as lines of code or certain code functionality.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

receiving a request to attribute source code contributions to a particular snapshot in a project having a revision graph with multiple branches;

receiving a designation of a single path through the revision graph defining a master branch, the single path including the particular snapshot and a plurality of other snapshots;

attributing source code contributions occurring in each non-merge commit on the single path to a responsible developer entity of the non-merge commit; and processing each merge commit on the single path including:

identifying source code contributions introduced by the merge commit, wherein the merge commit merges one or more master branch snapshots with one or more feature branch snapshots from one or more feature branches;

identifying one or more respective responsible developer entities for the source code contributions occurring in the one or more feature branch snapshots from one or more feature branches, and attributing source code contributions occurring in the one or more feature branch snapshots from the one or more feature branches to the identified one or more respective responsible developer entities.

Embodiment 2 is method of embodiment 1, wherein the source code contributions comprise violation introductions, violation removals, or both.

Embodiment 3 is the method of embodiment 2, wherein identifying one or more respective responsible developer entities for the source code contributions occurring in the one or more feature branch snapshots from one or more feature branches comprises computing transitive violation matching information for violations introduced or removed in the one or more feature branch snapshots.

Embodiment 4 is the method of any one of embodiments 1-3, wherein attributing source code contributions occurring in the one or more feature branch snapshots from the one or more feature branches to the identified one or more respective responsible developer entities comprises designating the source code contribution made in the one or more feature branches to have been contributed as of the time of the merge commit.

Embodiment 5 is the method of any one of embodiments 1-4, wherein receiving a designation of a single path through the revision graph defining a master branch comprises receiving user input specifying a plurality of snapshots including the particular snapshot.

Embodiment 6 is the method of any one of embodiments 1-5, wherein receiving a designation of a single path through the revision graph defining a master branch comprises receiving a designation of a master branch according to a version control system.

Embodiment 7 is the method of any one of embodiments 1-6, wherein attributing source code contributions occurring in the one or more feature branch snapshots from the one or more feature branches comprises ignoring all source code contributions on feature branches that are never merged with the master branch.

Embodiment 8 is a method comprising:

receiving a request to attribute violations introduced by a merge commit, wherein the merge commit merges two or more branches of a revision graph;

identifying violations that are introduced by the merge commit, wherein the violations that are introduced by the merge commit do not match violations in one or more parents of the merge commit;

computing transitively matched violations for each of the violations that are introduced by the merge commit to identify a respective author for each violation introduced by the merge commit; and attributing the violations introduced by the merge commit to corresponding authors of the transitively matched violations.

Embodiment 9 is the method of claim 8, wherein identifying violations that changed status from each merge commit includes:

comparing the merge commit to all ancestor revisions directly preceding the merge commit on the branch into which the merge commit was committed;

for violations that are in any of the ancestor revisions and not in the merge commit, identifying removed violations; and for violations that are in the merge commit and not in the ancestor revision, identifying introduced violations.

Embodiment 10 is the method of any one of embodiments 8-9, further comprising:

identifying lines of code from the merge commit that do not exist in the ancestor revision on the master revision branch;

determining historical commits of the feature branch for the merge commit;

identifying, from the plurality of historical commits, the historical commit of the feature branch where the lines of code were introduced; and attributing the historical commit to a particular developer who performed the commit to the feature branch.

Embodiment 11 is the method of any one of embodiments 8-10, further comprising providing statistics for code characteristic changes from branches that no longer exist.

Embodiment 12 is the method of any one of embodiments 8-11, further comprising:

providing statistics for code characteristic changes from branches that are merged back into the main branch.

Embodiment 13 is the method of any one of embodiments 8-12, further comprising: providing statistics for code characteristic changes from a single path through the revision graph.

Embodiment 14 is a system comprising: one or more computers and one or more storage devices storing instructions that are operable, when executed by the one or more computers, to cause the one or more computers to perform the method of any one of embodiments 1 to 13.

Embodiment 15 is a computer storage medium encoded with a computer program, the program comprising instructions that are operable, when executed by data processing apparatus, to cause the data processing apparatus to perform the method of any one of embodiments 1 to 15.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:

one or more computers and one or more storage devices storing instructions that are operable, when executed by the one or more computers, to configure the one or more computers to perform the following:

receive a request to attribute source code contributions to a particular commit in a project having a revision graph with multiple branches, including a master branch that corresponds with a designated single path through the revision graph and that includes the particular commit, the revision graph also including at least a first feature branch and at least a second feature branch that include source code contributions that are not part of the master branch;

attribute non-merge-commit contributions occurring on the master branch for each non-merge commit on the master branch, by attributing each non-merge commit to corresponding responsible developer entity of each non-merge commit; and process each merge commit on the single path of the master branch by at least:

identifying, for each merge-commit contribution of a feature branch with the master branch, a merge commit that merges a master branch commit with at least one feature branch commit; and attributing one or more merge-commit contributions from at least the first feature branch, to any corresponding responsible developer entity of the one or more merge-commit contributions, while ignoring at least one non-merge source code contribution from the second feature branch of the revision graph that is not merged with the master branch, and so as to refrain from attributing the at least one non-merge source code contribution of the second feature branch to the responsible developer entity.

2. The system of claim 1, wherein the source code contributions comprise violation introductions, violation removals, or both.

3. The system of claim 2, wherein the instructions are further operable to configure the one or more computers to compute transitive violation matching information for violations introduced or removed in one or more feature branch commits.

4. The system of claim 1, wherein the instructions are further operable to configure the one or more computers to receive the designation of the single path through the revision graph defining the master branch as user input specifying a plurality of snapshots including the particular commit.

5. The system of claim 1, wherein receiving a designation of a single path through the revision graph defining a master branch comprises receiving a designation of a master branch according to a version control system.

6. A method implemented by a computing system, the method comprising:

receiving user input defining a designated single path through a revision graph, the revision graph including multiple branches including a master branch that comprises the designated single path through the revision graph and that includes a particular commit, the revision graph also including at least a first feature branch and at least a second feature branch that include source code contributions that are not part of the master branch;

receiving a request to attribute source code contributions to the particular commit in the revision graph;

attributing non-merge-commit contributions occurring on the master branch for each non-merge commit on the master branch, by attributing each non-merge commit to corresponding responsible developer entity of each non-merge commit; and processing each merge commit on the single path of the master branch by at least:

identifying, for each merge-commit contribution of a feature branch with the master branch, a merge commit that merges a master branch commit with at least one feature branch commit; and attributing one or more merge-commit contributions from at least the first feature branch, to any corresponding responsible developer entity of the one or more merge-commit contributions, while ignoring at least one non-merge source code contribution from at least the second feature branch of the revision graph that is not merged with the master branch, and so as to refrain from attributing the at least one non-merge source code contribution of the second feature branch to the responsible developer entity.

7. The method of claim 6, wherein the source code contributions comprise violation introductions, violation removals, or both.

8. The method of claim 6, wherein the method further includes computing transitive violation matching information for violations introduced or removed in one or more feature branch commits.

9. The method of claim 6, wherein receiving a designation of a single path through the revision graph defining a master branch comprises receiving a designation of a master branch according to a version control system.

10. A computer program product comprising:

one or more hardware storage devices having stored computer-executable instructions that are operable, when executed by one or more processors, to configure the one or more processors to perform the following:

receive a request to attribute source code contributions to a particular commit in a project having a revision graph with multiple branches, including a master branch that corresponds with a designated single path through the revision graph and that includes the particular commit, the revision graph also including at least a first feature branch and at least a second feature branch that include source code contributions that are not part of the master branch;

attribute non-merge-commit contributions occurring on the master branch for each non-merge commit on the master branch, by attributing each non-merge commit to corresponding responsible developer entity of each non-merge commit; and process each merge commit on the single path of the master branch by at least:

identifying, for each merge-commit contribution of a feature branch with the master branch, a merge commit that merges a master branch commit with at least one feature branch commit; and attributing one or more merge-commit contributions from at least the first feature branch, to any corresponding responsible developer entity of the one or more merge-commit contributions, while ignoring at least one non-merge source code contribution from the second feature branch of the revision graph that is not merged with the master branch, and so as to refrain from attributing the at least one non-merge source code contribution of the second feature branch to the responsible developer entity.

11. The computer program product of claim 10, wherein the source code contributions comprise violation introductions, violation removals, or both.

12. The computer program product of claim 11, wherein the instructions are further operable to configure the one or more computers to compute transitive violation matching information for violations introduced or removed in one or more feature branch commits.

13. The computer program product of claim 10, wherein the instructions are further operable to configure the one or more computers to receive the designation of the single path through the revision graph defining the master branch as user input specifying a plurality of snapshots including the particular commit.

14. The computer program product of claim 10, wherein receiving a designation of a single path through the revision graph defining a master branch comprises receiving a designation of a master branch according to a version control system.

* * * * *